US009825860B2

(12) United States Patent
Azgin et al.

(10) Patent No.: US 9,825,860 B2
(45) Date of Patent: Nov. 21, 2017

(54) FLOW-DRIVEN FORWARDING ARCHITECTURE FOR INFORMATION CENTRIC NETWORKS

(71) Applicant: Futurewei Technologies Inc., Plano, TX (US)

(72) Inventors: Aytac Azgin, Santa Clara, CA (US); Ravishankar Ravindran, San Ramon, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 134 days.

(21) Appl. No.: 14/724,472

(22) Filed: May 28, 2015

(65) Prior Publication Data
US 2015/0350078 A1 Dec. 3, 2015

Related U.S. Application Data

(60) Provisional application No. 62/005,605, filed on May 30, 2014.

(51) Int. Cl.
*H04L 12/721* (2013.01)
*H04L 12/741* (2013.01)
(Continued)

(52) U.S. Cl.
CPC .......... *H04L 45/745* (2013.01); *H04L 45/306* (2013.01); *H04L 45/38* (2013.01); *H04L 45/70* (2013.01); *H04L 47/17* (2013.01); *H04L 47/35* (2013.01); *H04L 67/2842* (2013.01); *H04L 67/2852* (2013.01)

(58) Field of Classification Search
CPC ....... H04L 45/14; H04L 45/20; H04L 45/306; H04L 45/38; H04L 45/64; H04L 45/74; H04L 45/745; H04L 67/16; H04L 67/28; H04L 67/2842; H04L 67/2847;
(Continued)

(56) References Cited

U.S. PATENT DOCUMENTS 6,768,738 B1 * 7/2004 Yazaki ................... H04L 12/46
370/392
8,300,532 B1 * 10/2012 Venkatramani ....... H04L 45/306
370/235
(Continued)

*Primary Examiner* — Alpus H Hsu
(74) *Attorney, Agent, or Firm* — Vierra Magen Marcus LLP

(57) ABSTRACT

A flow-driven forwarding strategy includes receiving an Interest packet, where the interest packet includes a flow state indicator. The content associated with the Interest packet is checked to determine whether that content is locally stored. Another check is performed to determine whether any previously received Interest packet has requested the content. In response to the content not being locally stored and no related Interest packet has been previously received, the flow state indicator is checked in the Interest packet. In response to the flow state indicator indicating that the Interest packet is associated with an active flow, forwarding information is extracted from a flow state table if a hop count has a value of zero or from the Interest packet if the hop count has a value greater than zero. The Interest packet is then forwarded to a next hop in accordance with the forwarding information.

14 Claims, 11 Drawing Sheets

(51) Int. Cl.
*H04L 12/801* (2013.01)
*H04L 29/08* (2006.01)
*H04L 12/725* (2013.01)

(58) Field of Classification Search
CPC ..... H04L 67/2852; H04L 45/70; H04L 47/17; H04L 47/35
See application file for complete search history.

(56) References Cited

U.S. PATENT DOCUMENTS

| | | | | |
|---|---|---|---|---|
| 8,694,675 B2* | 4/2014 | Wang | H04L 67/327 | 709/206 |
| 8,743,690 B1* | 6/2014 | Janarthanan | H04L 47/31 | 370/235 |
| 9,049,251 B2* | 6/2015 | Ravindran | H04L 67/327 | |
| 9,253,087 B2* | 2/2016 | Zhang | H04L 45/74 | |
| 9,253,091 B2* | 2/2016 | You | H04L 45/306 | |
| 9,276,840 B2* | 3/2016 | Scott | H04L 45/306 | |
| 9,363,179 B2* | 6/2016 | Mosko | H04L 45/745 | |
| 9,515,920 B2* | 12/2016 | Zhang | H04L 45/306 | |
| 2013/0262698 A1* | 10/2013 | Schwan | H04L 45/00 | 709/242 |
| 2013/0336323 A1* | 12/2013 | Srinivasan | H04L 45/00 | 370/392 |
| 2014/0023072 A1* | 1/2014 | Lee | H04L 45/742 | 370/389 |
| 2014/0149532 A1* | 5/2014 | Kim | H04L 67/2852 | 709/213 |
| 2014/0164552 A1* | 6/2014 | Kim | H04L 67/2842 | 709/214 |
| 2014/0192717 A1* | 7/2014 | Liu | H04W 60/00 | 370/328 |
| 2014/0204945 A1* | 7/2014 | Byun | H04L 45/74 | 370/392 |
| 2015/0095481 A1* | 4/2015 | Ohnishi | H04L 1/004 | 709/223 |
| 2015/0095514 A1* | 4/2015 | Yu | H04W 40/10 | 709/242 |
| 2015/0120924 A1* | 4/2015 | Scott | H04L 69/22 | 709/225 |
| 2015/0244463 A1* | 8/2015 | Ravindran | H04B 10/27 | 398/58 |
| 2015/0256601 A1* | 9/2015 | Mosko | H04L 67/2842 | 709/213 |
| 2015/0280984 A1* | 10/2015 | Mahadevan | H04L 61/1582 | 709/222 |
| 2015/0281376 A1* | 10/2015 | Mahadevan | H04L 41/0809 | 709/223 |
| 2015/0296028 A1* | 10/2015 | Scott | H04L 67/16 | 709/217 |
| 2016/0036730 A1* | 2/2016 | Kutscher | H04L 45/38 | 370/401 |

\* cited by examiner

FLOW-DRIVEN FORWARDING ARCHITECTURE FOR INFORMATION CENTRIC NETWORKS

RELATED APPLICATIONS

This application claims the benefit of U.S. Provisional Application No. 62/005,605 filed May 30, 2014 entitled FLOW-DRIVEN FORWARDING ARCHITECTURE FOR INFORMATION CENTRIC NETWORKS, which is hereby incorporated by reference herein.

TECHNICAL FIELD

The present disclosure relates generally to information-centric networking (ICN) and more particularly to a method and system for providing flow-driven forwarding in an information-centric network.

BACKGROUND

Information-centric networking, also known as content centric networking (CCN) or named-data networking (NDN), is currently well suited to enable customers and service providers to discover and exchange information, such as information in an ad hoc device-to-device (D2D) scenario. ICN allows a user to focus on the data needed, rather than having to reference a specific, physical location where that data is to be retrieved from. ICN provides a wide range of benefits such as content caching to reduce congestion and improve delivery speed, simpler configuration of network devices, and building security into the network at the data level.

Current ICN forwarding solutions are not optimized to efficiently handle flow-based traffic. The overhead introduced during each forwarding lookup (through the use of longest prefix matching) is a major limiting factor in achieving the targeted transmission rates. Current approaches typically aim to reduce the processing cycles required for each lookup, independent of the other lookups. However, since each request (or Interest) is treated as a separate entity, results from the previous similar lookups (for instance, for packets carrying the same forwardable portion of the content name) are not utilized. To support the desired 100+Gbps rates for an ICN content router, an efficient technique is needed to proactively take advantage of the results from the previous lookups.

SUMMARY

From the foregoing, it may be appreciated by those skilled in the art that a need has arisen to reduce the processing overhead involved with packet forwarding lookups within an ICN configuration. In accordance with the present disclosure, a method and system for providing flow-driven forwarding in an information-centric network are provided that greatly reduce and substantially eliminate the problems associated with conventional information-centric networking techniques.

A flow-driven forwarding strategy includes receiving an Interest packet, where the Interest packet includes a flow state indicator flag. The content associated with the Interest packet is checked to determine whether that content is locally stored. Another check is performed to determine whether any previously received Interest packet has requested the content. In response to the content not being locally stored and no related Interest packet has been previously received, the flow state indicator is checked in the Interest packet. In response to the flow state indicator indicating that the Interest packet is associated with an active flow, forwarding information is extracted from a flow state table if a hop count has a value of zero or from the Interest packet if the hop count has a value greater than zero. The Interest packet is then forwarded to a next hop in accordance with the forwarding information.

The present disclosure provides various technical advantages over conventional packet forwarding techniques. For example, one technical advantage is to provide a flow-driven forwarding strategy to reduce lookup overhead and speedup packet processing at the ICN content routers to support higher packet delivery rates. The techniques disclosed herein provide increased forwarding efficiency by using less processing resources to support higher speeds, reducing forwarding cost. This distributes processing-load along the path and takes advantage of flow continuity for especially unique or uncacheable content. Forwarding efficiency is increased by using previously selected forwarding metrics and creating a new Interest message format to include such information.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 13, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

Figure 1:
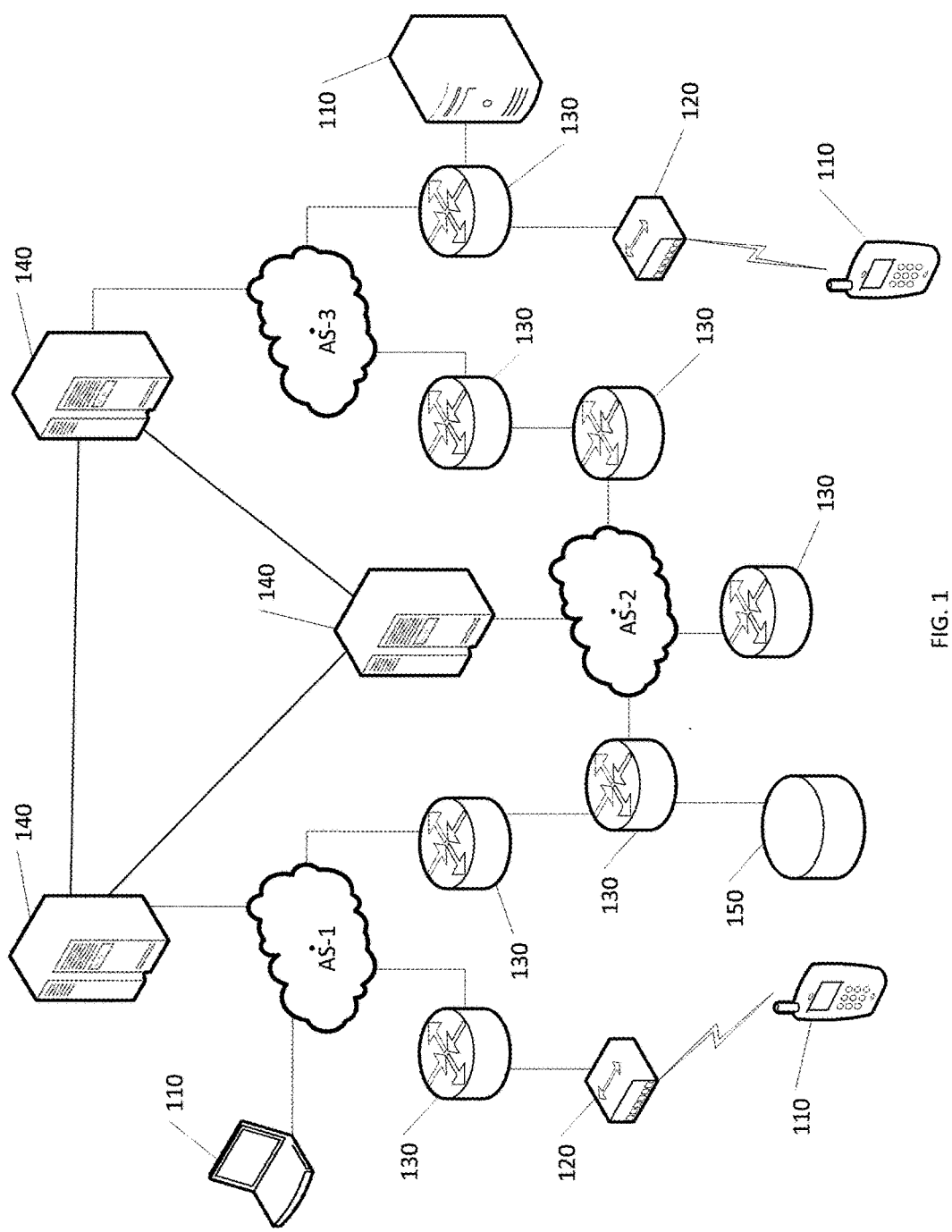
FIG. 1 illustrates an ICN network architecture that supports a software defined ICN switch implementing a Content-Centric Networking (CCN) protocol according to the present disclosure.

FIG. 1 illustrates an ICN network 100 that supports a protocol data unit (PDU) format according to the present disclosure. The system 100 may comprise a plurality of nodes (N) 110 serviced by a plurality of access points or gateways 120 providing network access to the nodes 110, a plurality of content routers (R) 130, also referred to as edge/service/core routers (ER, SR, CR), a plurality of interconnected domain controllers (AS) 140, and one or more content repositories 150. In network 100, each entity (e.g. content portion, chunk, node, or networking element) may be uniquely identified by an identifier. Each node 110 may be a Consumer or a Producer of content as discussed in this disclosure. ICN network 100 may implement any of a various protocols for requesting and delivering content. An example protocol is Content Centric Networking (CCN). The CCN protocol is a transport protocol built on named data irrespective of the identities or locations of machines involved. CCN has no notion of host at its lowest level. A packet "address" names content, device, or service, but not location. The CCN protocol efficiently delivers named content rather than connecting hosts to other hosts. Every packet of data may be cached at any gateway 120, content router 130, and domain controllers 140. Combined with intrinsic support for multicast or broadcast delivery, this leads to a very efficient use of the network when many people are interested in the same content.

The CCN protocol emphasizes content by making it directly addressable and routable. Endpoints communicate based on named data instead of IP addresses. CCN is characterized by the basic exchange of content request messages (called "Interests") and content return messages (called "Content Objects"). The Interest message is used to request data by name. Specifically, an Interest message can identify a chunk of content to retrieve. Alternatively, an Interest message can provide a name prefix and other qualifications to restrict what data is acceptable from the collection named by the prefix. The Content Object is used to supply data. A Content Object message not only contains a data payload but the identifying name (without the implicit digest component), a cryptographic signature, and identification of the signer (called the publisher) along with other information about the signing. Formally, a Content Object message is an immutable binding of a name, a Producer, and a chunk of data. Every Content Object message is required to contain a valid signature. In this way, all data communicated with the CCN protocol is attested.

Communication using the CCN protocol is receiver-controlled. A Consumer of data transmits an Interest message over available connectivity and any party receiving the message and having data that matches, or satisfies, the request (according to the specifications in the Interest Message) may transmit a matching Content Object message. Data is only transmitted in response to an Interest that matches the Data. An Interest message may be transmitted using broadcast or multicast facilities of the underlying transport in order to reach many potential sources of data with minimal bandwidth cost.

Figure 2:
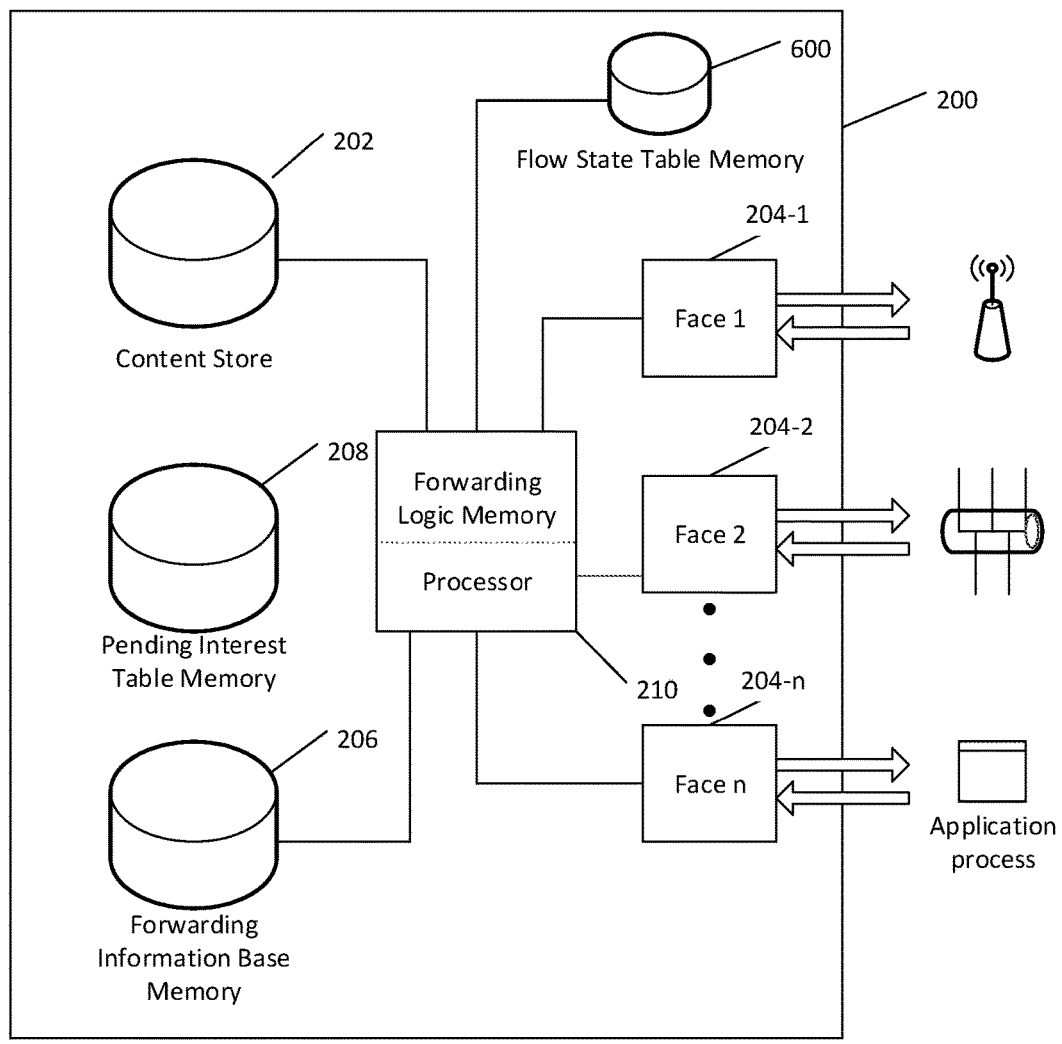
FIG. 2 illustrates a simplified block diagram of a CCN node configuration within a network entity of the network architecture.

FIG. 2 shows an example of components at a gateway 120, content router 130, or other entity in ICN network 100 operating as a CCN node 200 implementing the disclosed CCN protocol, which is the original CCN protocol modified to provide support to enable flow based forwarding. A full CCN node (as opposed to a limited CCN party such as a single application), in the proposed architecture, includes the following data structures to provide buffering/caching and loop-free forwarding. Proposed CCN node 200 includes a Content Store (CS) 202, one or more network interfaces (Faces) 204-1 to 204-$n$, a Forwarding Information Base memory (FIB) 206, a Pending Interest Table memory (PIT) 208, Processor 210 with forwarding logic memory, and a Flow State Table memory 600. CS 202 has a buffer memory organized for retrieval of Content Objects by prefix match lookup on names. Since CCN Content Object messages are self-identifying and self-authenticating, each one is potentially useful to many Consumers. CS 202 implements a replacement policy that maximizes the possibility of reuse such as Least Recently Used (LRU) or Least Frequently Used (LFU). CS 202 also implements a staleness bit. CS 202 may retain Content Object messages indefinitely but is not required to take any special measures to preserve them. Each CS 202 associates a staleness bit with every Content Object.

Faces 204-1 to 204-$n$ are a generalization of the concept of an interface. Faces 204-1 to 204-$n$ may be a connection to a network or directly to an application party. Faces 204-1 to 204-$n$ may be configured to send and receive broadcast or multicast packets on a particular network interface, or to send and receive packets using point-to-point addressing in the underlying transport, or using a tunnel (for example a TCP tunnel). Faces 204-1 to 204-$n$ may also be the connection to a single application process running on the same machine, via an encapsulation like UDP or an OS-specific inter-process communication path. All messages arrive through a face and are sent out through a face. Each face may have a plurality of line cards providing ingress to and egress from CCN node 200.

FIB 206 provides a table of outbound faces for Interests, organized for retrieval by longest prefix match lookup on names. Each prefix entry in FIB 206 may point to a list of Faces 204-1 to 204-$n$ rather than only one.

PIT 208 is a table of sources for unsatisfied Interests, organized for retrieval by longest prefix match lookup on names. Each entry in PIT 208 may point to a list of sources. Entries in PIT 208 time out rather than being held indefinitely.

Processor 210 interfaces with CS 202, PIT 208, FIB 206, and Faces 204-1 to 204-$n$ to process Interest and Content Object messages as described below.

FST 600 is a new addition to the CCN protocol pursuant to this disclosure. FST 600 provides a faster alternative to FIB 206 for lookups and carries information on active flows between a Consumer and a Producer.

Figure 3:
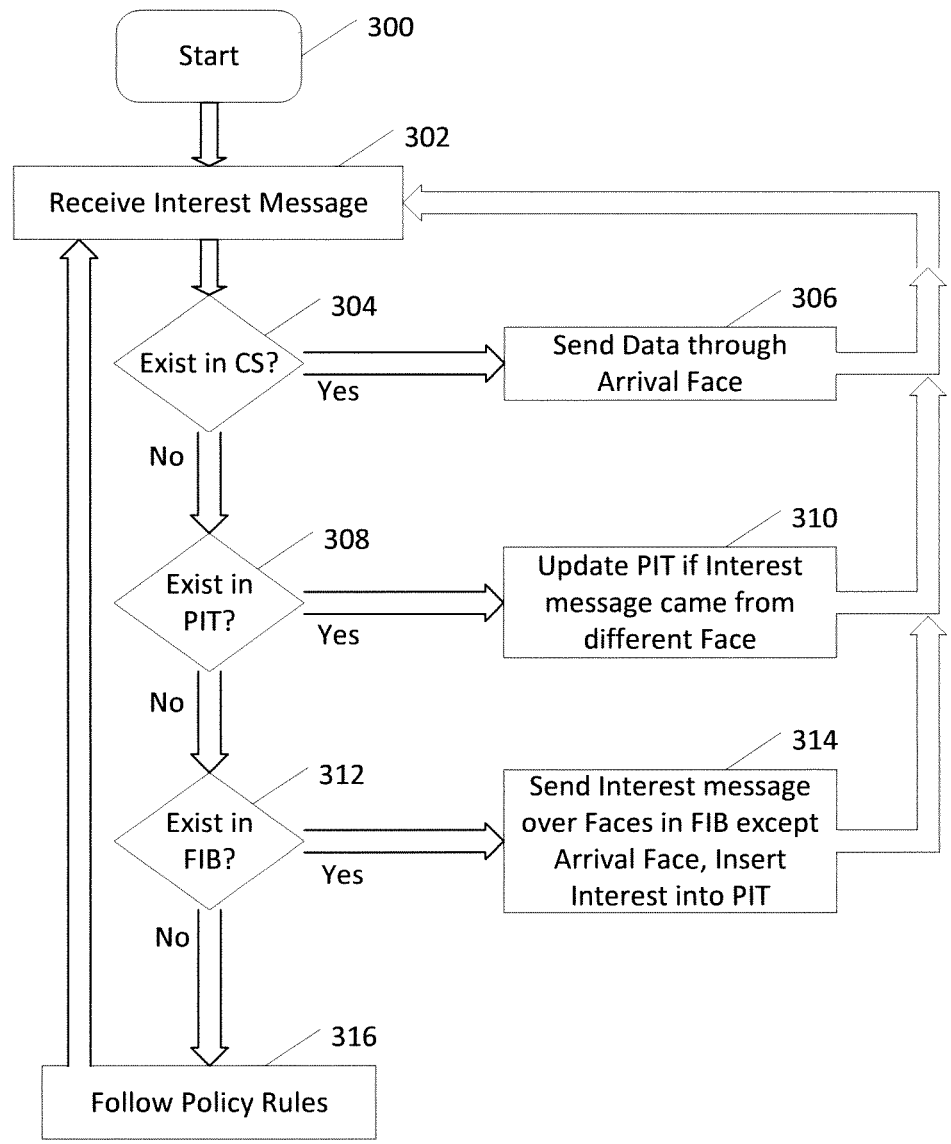
FIG. 3 illustrates a process flow for processing an Interest message at the CCN node.

FIG. 3 shows a typical process 300 for handling an Interest Message by the CCN/NDN protocol. When an Interest Message is received at block 302 on an arrival Face 204-$n$, a Lookup is performed in CS 202 at block 304. If a matching Content Object is found, it will be transmitted out of the arrival Face 204-$n$ at block 306 as a response to the Interest Message. To match, a Content Object must satisfy all of the specifications given in the Interest Message. Multiple Content Objects may simultaneously match in which case the specification in the Interest Message will be used to determine which Content Object to return. When a match is found in CS 202, processing stops and the Interest Message is discarded.

If there is no match at CS 202, a lookup is performed in PIT 208 at block 308. If a matching Interest Message is found in PIT 208, an equivalent Interest Message has already been forwarded and is pending. The arrival Face 204-*n* of the new Interest Message is added to the list of sources of unsatisfied Interests in PIT 208 at block 310 and the Interest Message is discarded.

If there is no match at PIT 208, a lookup is performed in FIB 206 at block 312. If a matching prefix is found in FIB 206, an entry is created in PIT 208 identifying the arrival Face 204-*n* of the Interest Message and the message is transmitted according to the strategy rules to one or more of the outbound Faces 204-1 to 204-*n* registered for the prefix in FIB 206 at block 314. Note that one of the outbound Faces 204-1 to 204-*n* may actually be connected to a local agent that uses the semantics of the name to dynamically configure new faces.

If no match is found in the previous steps, then the node has no way to satisfy the Interest Message at present. Policy rules may be followed at block 316 to handle this situation. The Interest Message may be held for a short time before being discarded, and the creation of a new FIB 206 entry at block 316 may provide a way to satisfy the Interest Message. As shown above, CCN content names are not interpreted in the operation of the CCN protocol itself, just matched. All assignment of meaning to names or their component parts comes from the application, institution, and/or global conventions reflected in prefix forwarding rules.

Figure 4:
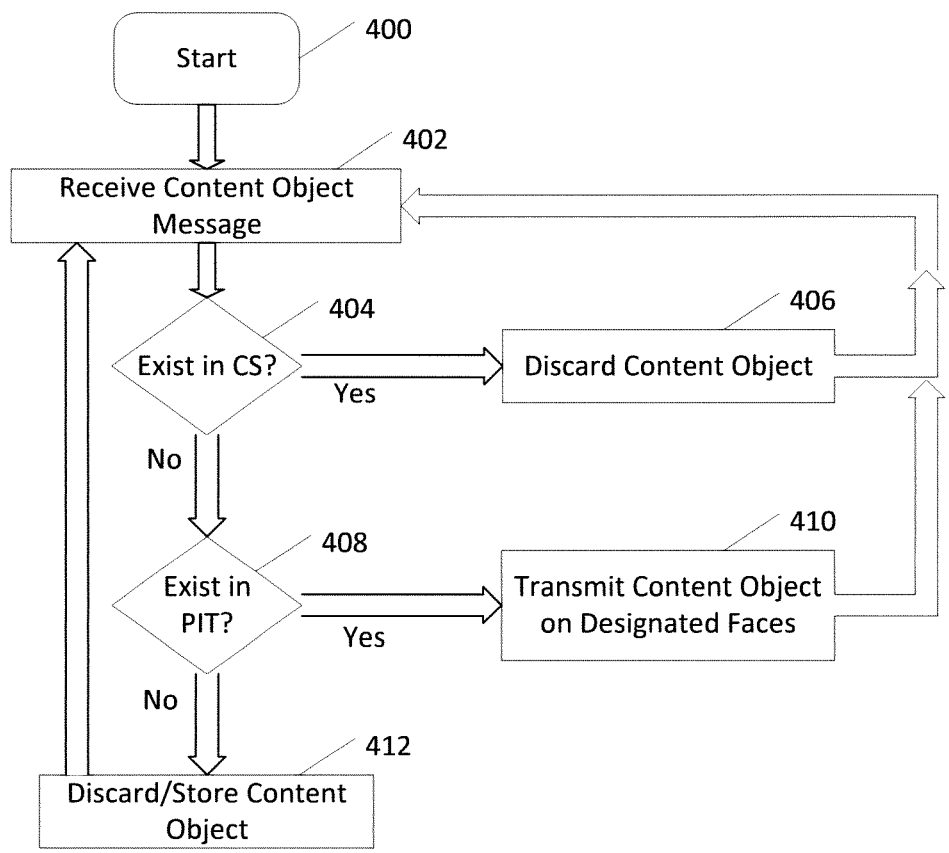
FIG. 4 illustrates a process flow for processing a Content Object message at the CCN node.

FIG. 4 shows a typical process 400 for handling Content Object messages by the CCN/NDN protocol. A Content Object message is received at block 402. A lookup is performed in CS 202 at block 404. If a matching Content Object is found it means that the newly arrived Content Object is a duplicate which can safely be discarded at block 406, because any Interest Messages have already been satisfied and new ones will be satisfied out of CS 202.

If there is no match at CS 202, a lookup is performed in PIT 208 at block 408. If there is a match in PIT 208, the Content Object is transmitted at block 410 on all of the source Faces 204-1 to 204-*n* for the Interests represented in PIT 208. A node may perform verification of the Content Object before forwarding it and may apply various policy restrictions. The content Object is then cached at CS 202.

If no match is found in PIT 208, then the content is unsolicited. A node does not forward unsolicited data. At block 412, the unsolicited data may be discarded or may be stored in CS 202 in case it is subsequently requested.

In Information Centric Networks, the Longest Prefix Matching (LPM) is used on each received Interest prefix to find the outgoing interface or line card (LC) information for the packet to reach the next hop. The LPM process typically requires multiple accesses to the high-latency off-chip memory, even if a Bloom filter is used (in the on-chip memory) to reduce the number of such accesses. However, forwarding namespace for information centric networks is expected to reach sizes much larger than what the current on-chip Bloom filters can support at very low cost (i.e., perceivably higher values for the false positive ratio, if more entries are inserted without increasing the storage size, leading to additional lookups that result in the checking of non-matching entries). The LPM multi-memory access problem is exacerbated especially for the long-running flows (e.g., file-download, video-streaming services) that use the same interfaces at the same hops (or routers), increasing the overhead unnecessarily.

As FIB 206 size is expected to scale to hundreds of millions of entries or more in CCN, accessing FIB 206 entries in a timely manner to support forwarding at line speeds of 100 Gbps or higher becomes a critical concern. As FIB 206 access requires the use of longest prefix matching (LPM), false positives limit the efficiency of LPM. If a packet from a given flow incurs multiple false-positives, the same will happen to the upcoming packets for the same flow. Furthermore, since FIB 206 is implemented on the high-latency off-chip memory, accessing those entries and making a forwarding decision can easily take hundreds (or thousands) of processing cycles. The above problem is exacerbated if the router regularly receives packets leading to many false positive triggered checks, for instance in the case of end-to-end content flows that can generate hundreds or thousands of requests during the lifetime of a flow.

As a result, current ICN forwarding solutions are not optimized to efficiently handle flow-based traffic. The overhead introduced during each forwarding lookup is a major limiting factor in achieving the targeted transmission rates. Current approaches typically aim to reduce the processing cycles required for each lookup, independent of other lookups. By taking advantage of the results on the previous lookups, that do not change frequently, the techniques disclosed herein significantly improve the forwarding performance, regardless of the lookup technique implemented at the local router. To efficiently address the scalable forwarding problem in CCN, the present disclosure provides an approach that is capable of switching an incoming Interest packet over a matching outgoing interface after parsing the header, instead of performing lookups locally.

Figure 5:
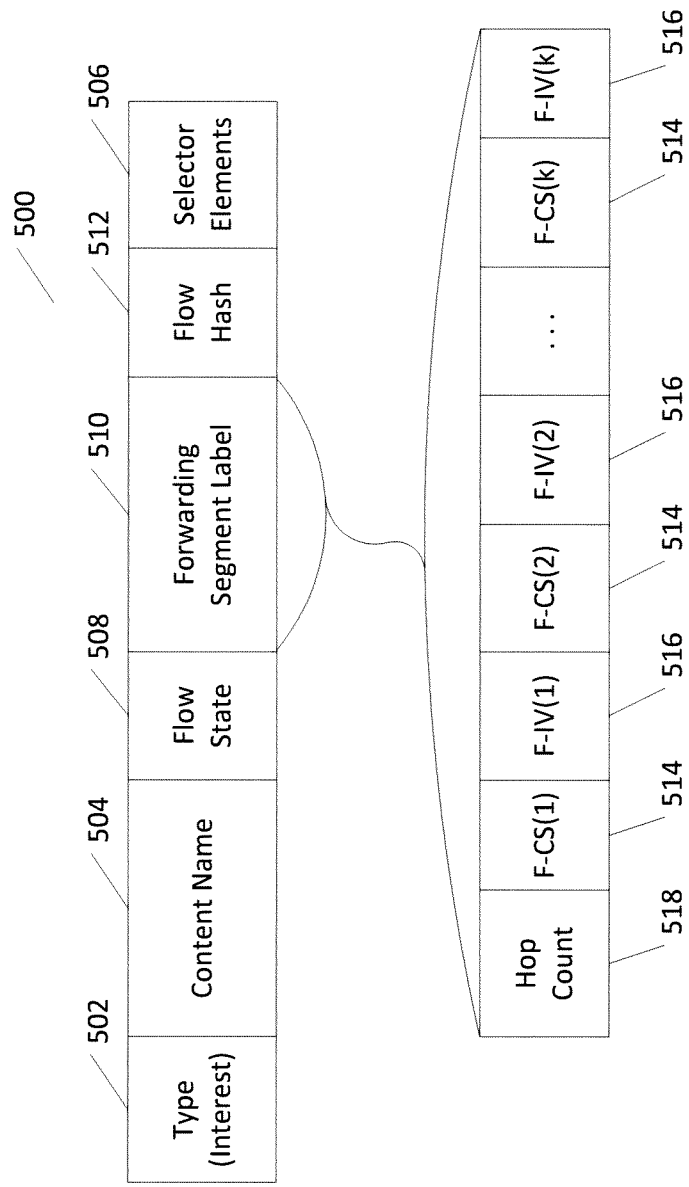
FIG. 5 illustrates an example Interest packet format in accordance with the present disclosure.

FIG. 5 shows an example Interest packet 500 with a new protocol data unit (PDU) format in accordance with the present disclosure. This new Interest packet structure 500 supports flow-based forwarding in Information Centric Networks, reduces lookup overhead, and speeds up packet processing at ICN routers to support higher packet delivery rates. Interest packet 500 includes at a minimum a Type field 502 and a Content Name field 504. The Type field 502 identifies the message as an Interest message. The Content Name field 504 represents a hierarchical name for the requested content and is the only required element in an Interest message. Interest packet 500 may include a Selector Elements field 506. Selector Elements field 506 may include the following elements—Name, MinSuffixComponents, MaxSuffixComponents, PublisherPublicKeyDigest, Exclude, ChildSelector, AnswerOriginKind, Scope, InterestLifetime, Nonce, and FaceID. These elements fall into several categories, for instance—1) those that further qualify the Content Objects that may match the Interest (MinSuffixComponents, MaxSuffixComponents, PublisherPublicKeyDigest, Exclude), 2) those that limit where the answer might come from (AnswerOriginKind, Scope, InterestLifetime), 3) those that advise the selection of what to send when there are multiple Content Objects that match (ChildSelector), and 4) duplicate suppression (Nonce).

The MinSuffixComponents and MaxSuffixComponents elements that specify limits on a number of name components beyond those in the prefix, and counting the implicit digest, that may occur in the matching ContentObject. The PublisherPublicKeyDigest element is a value that must be equal to the value of the PublisherPublicKeyDigest element of the Content Object for there to be a match. The Exclude element embodies a description of name components that should not appear as a continuation of the Name prefix in the response to the Interest. The ChildSelector element provides a way of expressing a preference for which Content Object should be returned when a given Interest matches more than one ContentObject within a given content store. The AnswerOriginKind element encodes several bitfields that control the response to the interest. The Scope limits where the Interest may propagate. The InterestLifetime element indicates the (approximate) time remaining before the Interest times out. The Nonce element carries a randomly-generated byte string that is used to detect and discard duplicate Interest messages. The FaceID element may be used to specify the desired outgoing face for forwarding the Interest.

To address the problems identified above, this new protocol data unit (PDU) format for Interest packet 500 defines three additional fields—Flow State 508, Forwarding Segment Label (FSL) 510, and Flow Hash 512. The Flow State field 508 represents the existence or the state of a flow for the given Interest packet. Flow State field 508 indicates whether or not the Interest packet utilizes or takes advantage of flow state information and, if it is, the status for the flow. For ease of representation, we assume state 0 indicates a no-flow state and state 1 indicates an active flow state. For example, a bit-string of 00 indicates a default no-flow state (i.e., transition from no-flow-state to no-flow-state); a bit string of 01 signals the need to set-up flow-states along the path (i.e., transition from no-flow-state to active-flow-state); a bit string of 11 indicates the presence of an active flow (i.e., transition from active-flow-state to active-flow-state); and a bit string of 10 signals the end of an active flow (i.e., transition from active-flow-state to no-flow-state). The Flow Hash field 512 is an assigned value set by the Producer of content to each of its flows to differentiate between different flows. The FSL field 510 is variable in size and carries related fast-forwarding information to speed up multi-hop forwarding by minimizing the number of lookups performed per Interest packet. The FSL field 510 includes a Hop Count value 518 multiple Forwarding Component Size (F-CS) values 514, and multiple (equal numbered) Forwarding Interface Value (F-IV) values 516 (or otherwise known as Forwarding Line Card (F-LC) values). Hop Count value 518 ideally represents the number of hops an Interest packet takes from the Consumer to the Producer, wherein a FIB lookup may be performed at each hop. However, if no forwarding information is shared among different administrative domains or autonomous systems (AS), then the hop count represents the number of hops traveled within each domain or AS along the path to the Producer from the Consumer. F-IV value 516 points to a particular egress line card, associated with a face 204-1 to 204-n, at a next hop. F-CS value 514 represents the number of name components used during the initial FIB lookup for Interest packets of a given end-to-end flow. By incorporating multiple F-CS values 514 and F-IV values 516 to the Forwarding Segment Label (corresponding to each to-be fast-forwarded hop for a given network segment, end-to-end or within an AS or among multiple AS), and introducing incremental hopping, processing-load balancing can be supported in the network. The load can be dynamically adapted to ongoing network conditions, in addition to reducing the number of FIB lookups performed per Interest between two endpoints (i.e., Consumer and Producer). Note that the values included within the FSL field 510 are updated at each forwarding hop during Interest packet forwarding or along the reverse path during flow path setup. For instance, along the forward path, Hop Count value 518 is decremented at each hop, while the local forwarding parameters in F-CS value 514 and F-IV value 516 are removed from the Interest packet before forwarding it to the next hop.

In current CCN/NDN architectures, no differentiation exists between packets from different flows or packets belonging to the same flow. Instead, each request (Interest) is treated as a separate entity. The use of Interest packet 500, with the proposed format, exploits the indirect connection between flow-driven packets, due to the fact that they are presumably delivered to the same Producer, and takes advantage of them to achieve load balancing and resource efficient forwarding. This disclosure results in fast and resource efficient local FIB lookup. Fast forwarding is supported by selectively bypassing FIB lookup at certain hops. This solution is flexible and provides dynamic on-the-fly support for load-balancing in the network by being adaptive to current network needs. This solution can co-exist together with the current ICN forwarding architecture, with no significant upgrades required on the ICN nodes. This solution also introduces minimal transmission overhead, which can be avoided if combined with hash-based forwarding solutions.

Figure 6:
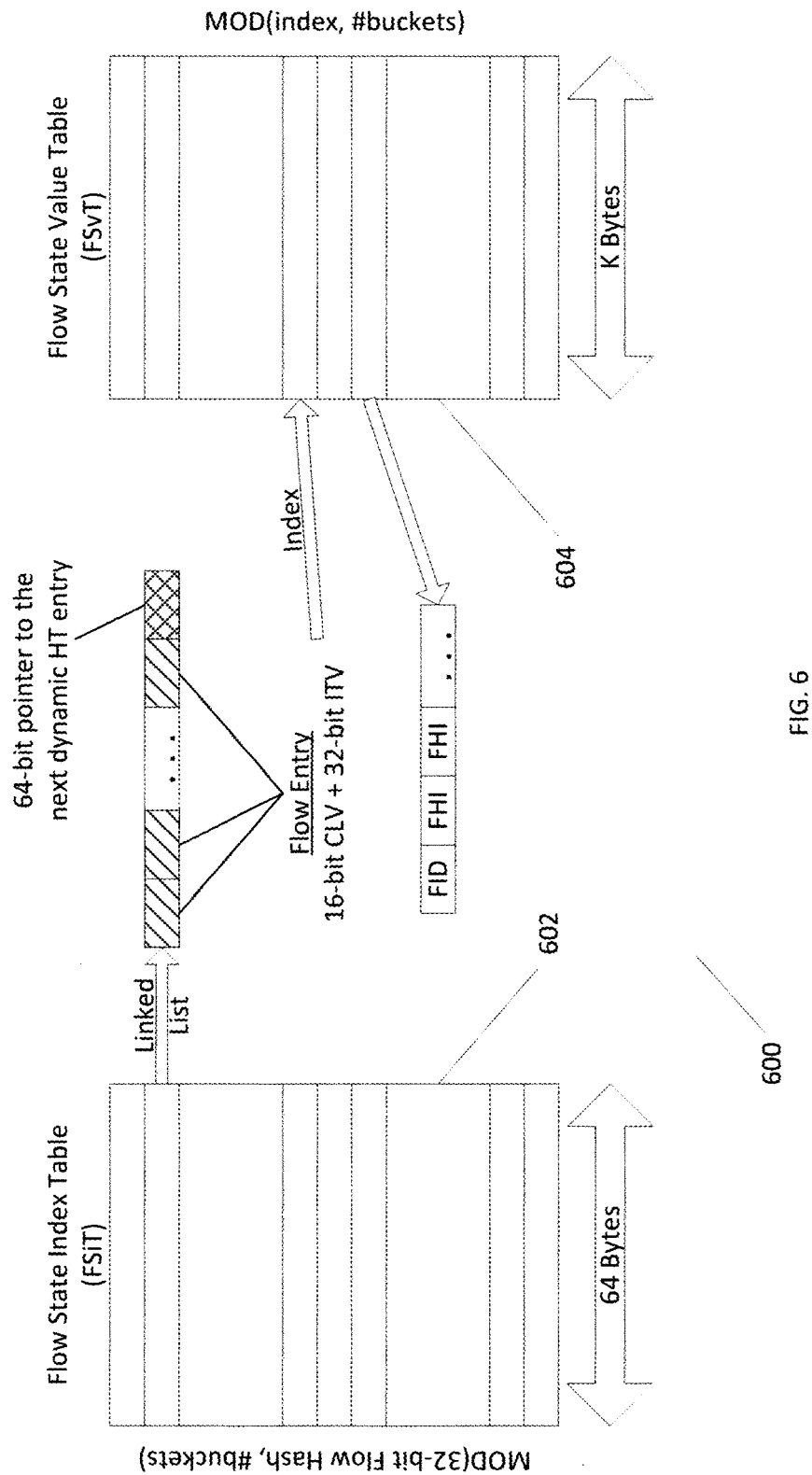
FIG. 6 illustrates an example flow state table for forwarding Interest packets in the network architecture.

FIG. 6 shows an example of a Flow State Table (FST) 600. To enable quick access to local flow states as opposed to directly accessing the FIB 206, a third database (in addition to PIT 208 and FIB 206) referred to as FST 600 is proposed to include all the active flow state information. FST 600 may use compact array buckets to organize flow table entries. FST 600 is hierarchically structured to include two sub-tables—a Flow State Index Table (FSiT) 602 and a Flow State Value Table (FSvT) 604. FSiT 602 is used to check for the existence of entries by locating with the initial 4-Byte portion of the Flow Hash field 212 and matching Component-Length-Value (CLV) field (CLV combines component and character length for the routable portion of content name extracted from the Data packet). If the entry exists, the associated forwarding parameters are located using Index-Type-Value (ITV) field pointing to a matching entry in FSvT 604. Each entry in FSvT 604 includes a Flow Identifier (FID) field (representing the last 4-Byte portion of the Flow Hash field 212 and a 2-Byte long outgoing interface metric) and multiple Flow Hop Identifier (FHI) fields (representing forwarding parameters for the future hops, which are saved during the flow setup phase). The FID is a 6-Byte long string, and FHI is a 5-Byte long string. For each flow, forwarding parameters are stored within one of the available FSvT 604 entries, depending on the maximum allowed hop count.

Figure 7:
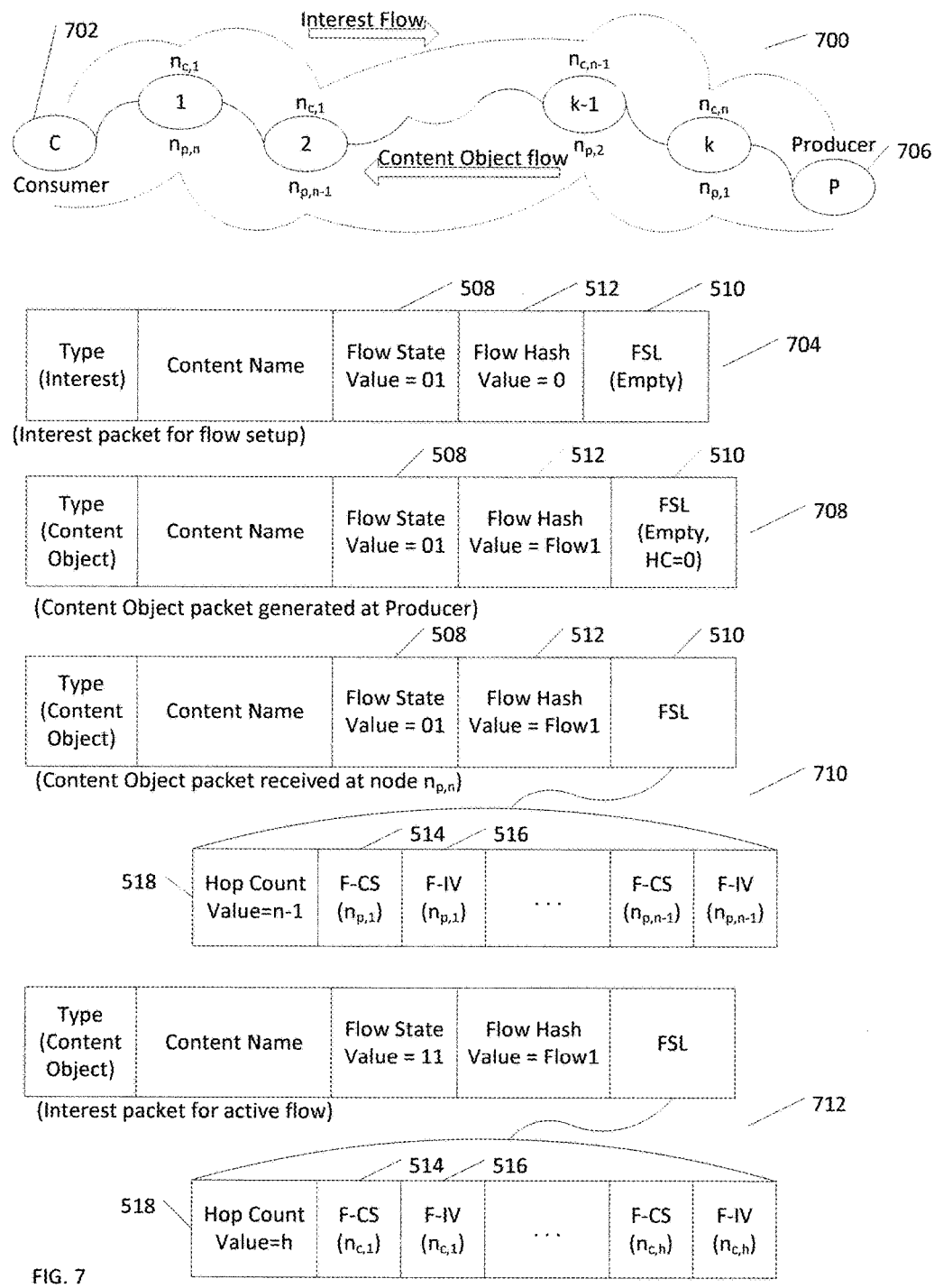
FIG. 7 illustrates examples of various packets routed through the network architecture.

FIG. 7 shows an example content of Interest and Content Object packets when setting up a flow in a route 700. To setup the flow states and FST 600 sub-tables FSiT 602 and FSvT 604, Consumer 702 sends the first Interest packet 704 with Flow State field 508 set to 01, Flow Hash field 512 set to 0, and no information in FSL field 510 (or not included in the first Interest packet). The Interest packet is processed at each node along the path to the Producer 706, using the default FIB 206 lookups, hence no modification is done on the current Interest forwarding process.

After the Interest packet is received by the Producer 706, content delivery ensues along the reverse path using CCN or NDN's breadcrumb approach. A Content Object packet 708 carrying the requested content data is sent by Producer 706 and includes a non-zero value for the Flow Hash field 512 as assigned by the Producer 706, a value of 01 for the Flow State field 508 indicating a flow setup, and a value of 0 for the Hop Count field 518. Along route 700, Content Object packet 708 is modified to enable flow setup on the reverse path. Each hop extracts the flow information from the Content Object packet to update its FST 600, while updating FSL field 510 with its egress information. Each hop updates its FST 600 with the forwarding information of previous hops along the route 700. Each hop will also increment a value for the Hop Count field 518 to identify the number of hops from Producer 706 (or the Gateway node 130 for the next domain, if the information is reset among different administrative domains).

A Content Object packet 710 is shown upon reaching hop 1. Content Object packet 710 includes forwarding information from all of the previous hops in route 700. Hop 1 updates its FST 600 with this forwarding information. After an FST 600 is populated with active flow entries at each hop, a forwarding lookup procedure is performed for subsequent Interest packets from the Consumer to the Producer. The forwarding lookup procedure utilizes the FST 600 instead of the FIB 206 lookup.

An Interest packet 712 for an active flow sent by Consumer 702 includes a value in Hop Count field 518 and forwarding information identifying egress line cards in one or more subsequent hops. The number of subsequent hops with forwarding information in Interest packet 712 is equal to the value in Hop Count field 518. The use of Hop Count field 518 allows for various techniques, such as random-hop forwarding, when sharing of forwarding information is limited or to adjust for network conditions to support process load balancing in the network 100. At each hop, the value in Hop Count field 518 is decremented. When the value of Hop Count field 518 reaches zero, assuming that Interest packet 712 has not reached Producer 706, the last hop will generate a new Interest packet 712 with forwarding information identifying egress line cards in one or more subsequent hops along the path to Producer 706 and include a value in Hop Count field 518 determining the number of hops the new Interest packet 712 flows through.

Two procedures may be used to terminate an ongoing flow and clear the active flow states at a particular content router (hop). A first procedure has the Consumer side sending an Interest packet with the Flow State field 508 set to 10. If a flow's data is shared by multiple Consumers, then corresponding flow entries are placed into a pending state and a timer is started to initiate their purge if no request is received during that period. A second procedure has the Producer sending a Content Object packet with the Flow State field 508 set to 10, requiring matching entries to be immediately flushed out from the content routers 130 along the reverse path to the Consumer.

Figure 8:
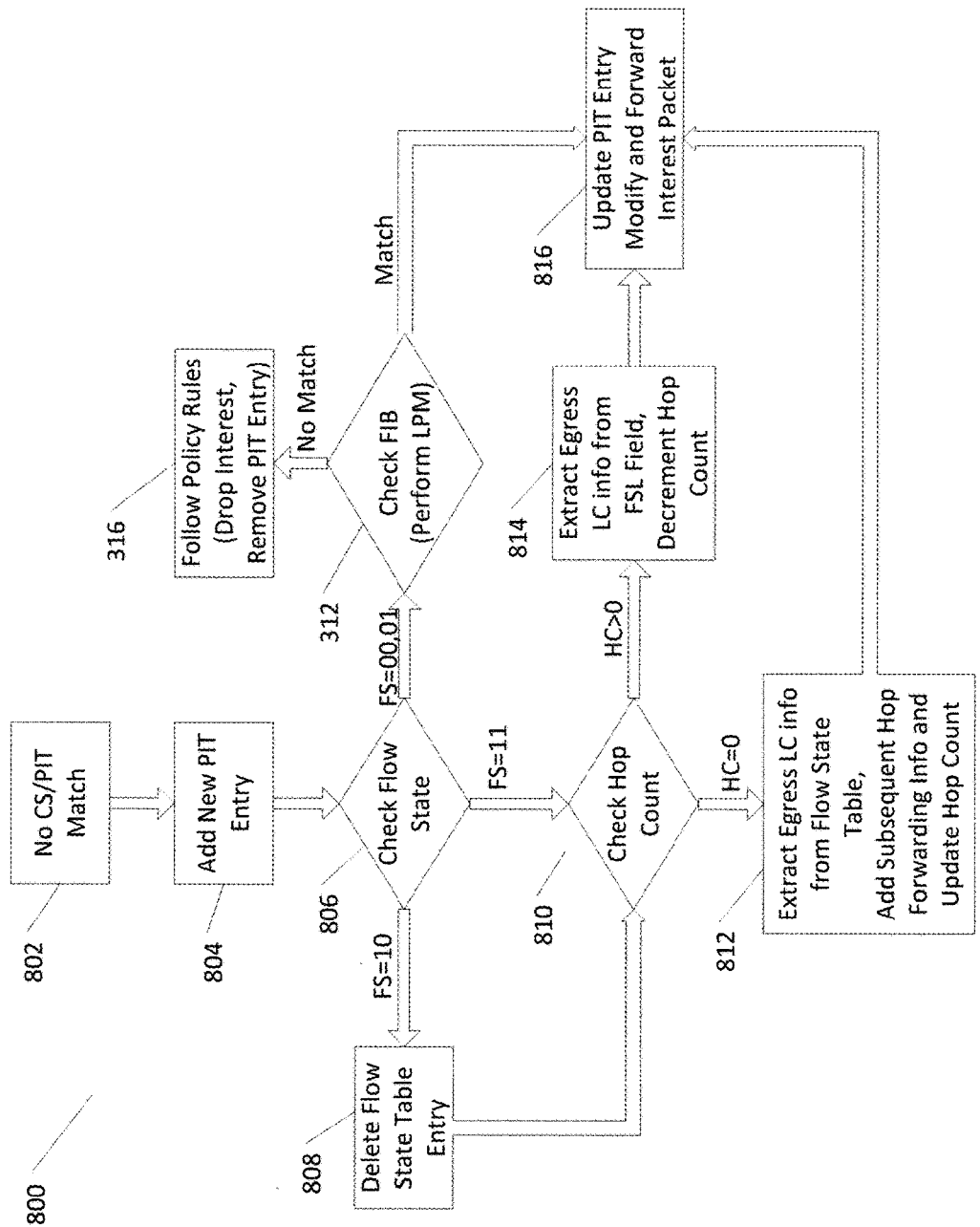
FIG. 8 illustrates a process flow for processing an Interest packet carrying forwarding information at the CCN node.

FIG. 8 shows an enhanced process 800 performed by processor 210 using computer readable instructions from the forwarding logic memory for handling Interest packets using the flow forwarding techniques as disclosed herein. Process 800 begins at block 802 where no matches occurred in CS 202 and PIT 208 (the No branch of block 308 of FIG. 3). At block 804, a new PIT entry is added for the Interest packet. The value of the Flow State field 508 of the Interest packet is then checked at block 806. If the Flow State field 508 has a value of 00 (no flow) or 01 (flow setup), process 800 proceeds to block 312 of FIG. 3 to perform the LPM lookup technique at FIB 206. If no match, then policy rules are followed at block 316 to include dropping the Interest packet and removing the new PIT entry.

If the Flow State field 508 has a value of 10 (end of flow), the corresponding entry in FST 600 is deleted at block 808. After deletion in FST 600 for an end of flow value, and when the Flow State field 508 has a value of 11 (active flow), process 800 proceeds to block 810 to check the value in Hop Count field 518. If Hop Count field 518 has a value of 0, forwarding information is extracted from FST 600 at block 812 to include obtaining egress line card information to forward the Interest packet to the next hop and possibly subsequent hops. If subsequent hops are included in the forwarding information extracted from FST 600, the value of Hop Count field 518 is updated to reflect the number of subsequent hops. If the value in Hop Count field is not 0, forwarding information in FSL field 510 of the Interest packet is determined at block 814, identifying the egress line card through which the Interest packet is to be forwarded to the next hop.

Forwarding of the Interest packet, and the egress line card information, to the next hop is determined from one of FIB 206 lookup at block 312, FSL field 510 extraction at block 814, and FST 600 extraction at block 812. PIT 208 and the Interest packet are updated at block 816 with forwarding information prior to forwarding the Interest packet to the next hop.

Figure 9:
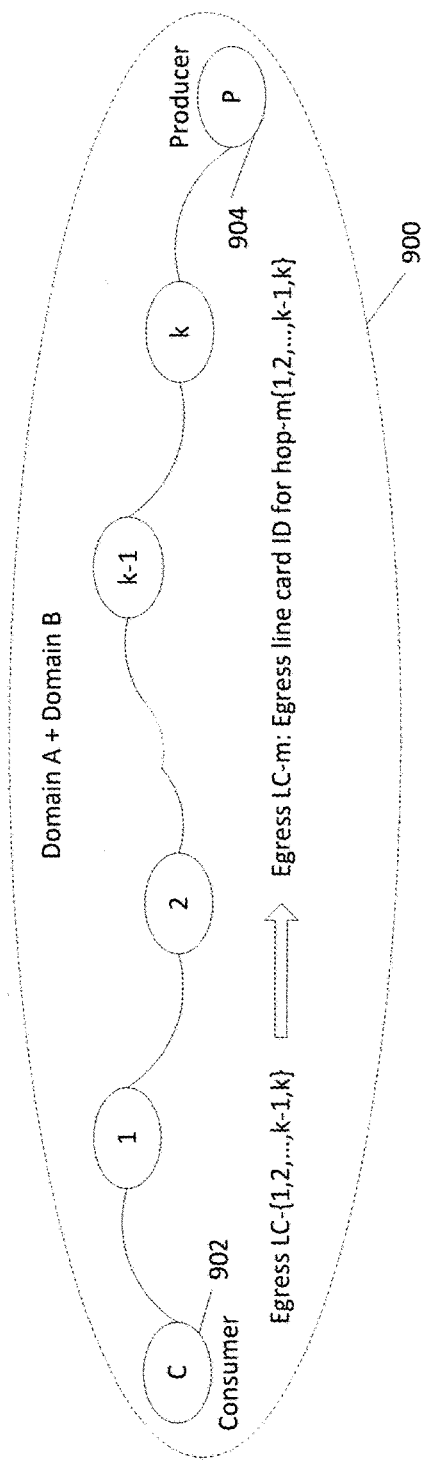
FIG. 9 illustrates an example use in the network architecture of an Interest packet carrying forwarding information.

FIG. 9 shows an example use of an Interest packet carrying forwarding information. If sharing of forwarding information within and across one or more domains 900 is allowed, a best case scenario requires only a single FIB 206 and/or FST 600 lookup between a Consumer 902 and a Producer 904 that is sufficient to support fast forwarding of the Interest packets. Consumer 902 may perform a FIB 206 and/or FST 600 lookup and include forwarding information in the Interest packet identifying the egress line card information at each of hops 1, 2, . . . , k−1, and k. Each hop in turn forwards the Interest packet to its egress line card identified in the Interest packet, without the need for a FIB 206 or FST 600 lookup. In a worst case scenario, each hop receives an Interest packet with only its egress line card information. Each hop then adds the next hop's egress line card information upon forwarding the Interest packet.

Figure 10:
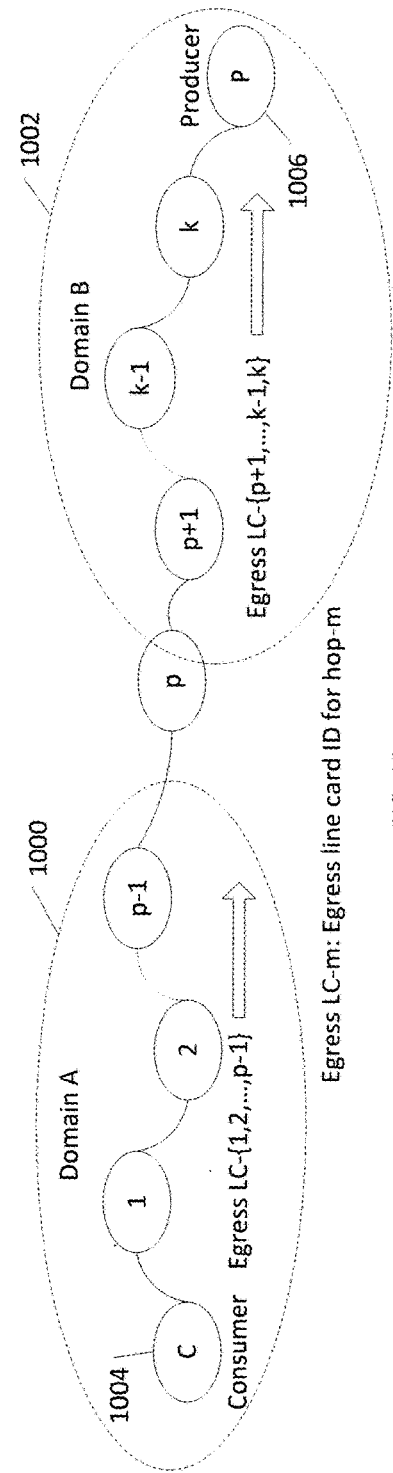
FIG. 10 illustrates another example use in the network architecture of an Interest packet carrying forwarding information.

FIG. 10 shows another example of using an Interest packet to carry forwarding information. If cross-domain information sharing is not allowed, then d forwarding lookups (FIB 206 or FST 600 lookups), where d represents the number of domains the Interest packets pass through, may be required to deliver the Interest packets from a Consumer 1004 to a Producer 1006. Forwarding lookups are performed at a minimum in the first hop of a Domain A 1000 and a first hop (p) within a Domain B 1002. In Domain A 1000, Consumer 1004 may generate an Interest packet including forwarding information for all hops 1, 2, . . . , and p−1 within Domain A 1000. Each hop in Domain A 1000 receiving the Interest packet will forward the Interest packet over the egress line card identified in the Interest packet without any lookup processing. Since no information is shared with Domain A in regards to forwarding in Domain B, the p hop performs a lookup that may result in identifying the hops in Domain B 1002 to Producer 1006. The p hop may generate an Interest packet including forwarding information for all hops p+1, . . . , k−1, and k within Domain B 1002 to Producer 1006. Each hop in Domain B 1002 receiving the Interest packet will forward the Interest packet over the egress line card identified in the Interest packet without any lookup processing until the Interest packet reaches Producer 1006 for processing.

Figure 11A:
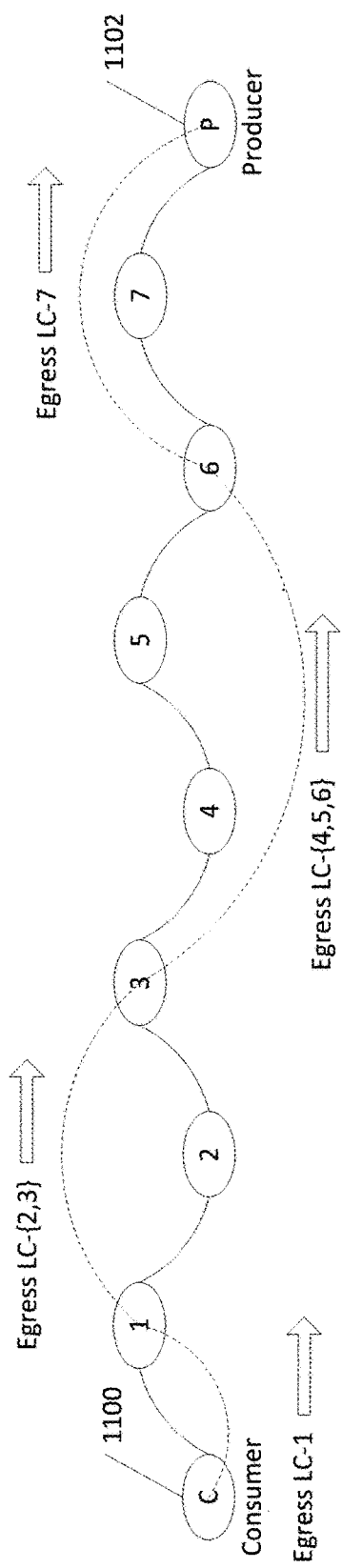
FIGS. 11A-11B show examples of load balancing support using Interest packets carrying forwarding information.
Figure 11B:
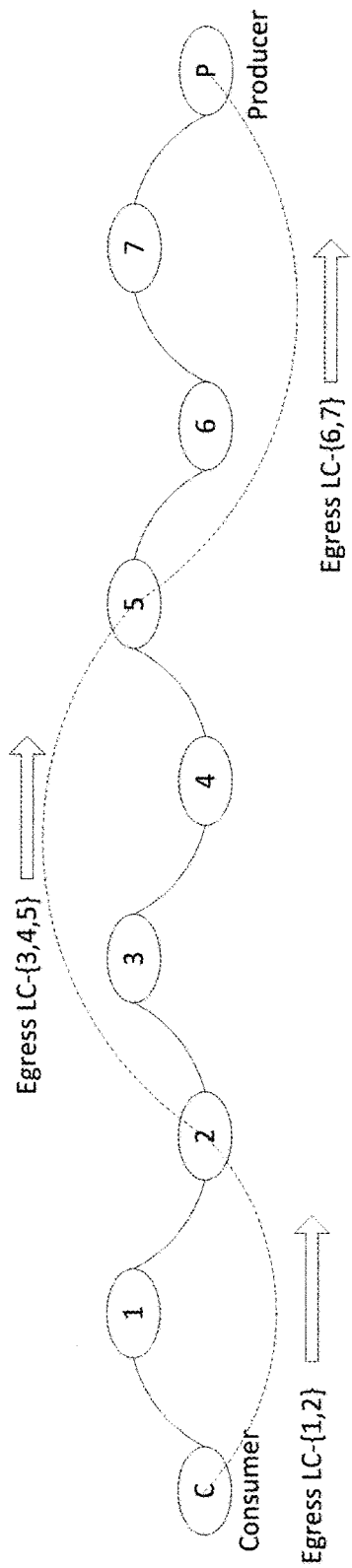

FIGS. 11A-11B show examples of load balancing support using Interest packets carrying forwarding information. FIGS. 11A-11B show a random-hop forwarding technique to support processing-load balancing in the network. In general, for each Interest packet, a random hopping distance is introduced (to randomize load distribution). Lookup for the next hops is performed at the last hop indicated within the received Interest packet. A hop-count measure that is decremented at each hop is used to determine at which hop a lookup occurs.

In random hop forwarding, a random hop count may be inserted into Hop Count field 518. For example, in FIG. 11A, Consumer 1100 generates an Interest packet with a bit value of 01 (one) in Hop Count field 518 and a corresponding number of F-CS 514 and F-IV 516 values. When the Interest packet reaches Hop 1, Hop 1 decrements the bit value in the Hop Count field 518 to 00 (zero), triggering the insertion of a new random bit value, in this case 10 (two), into Hop Count field 518. Accordingly, Hop 1 includes two hops worth of forwarding information in F-CS 514 and F-IV 516 values for Hops 2 and 3 and forwards the Interest packet based on the Hop 1 forwarding information provided by Consumer 1100. Hop 1 removes the Hop 1 forwarding information from the Interest packet.

The Interest packet passes through Hop 2 where the Hop 2 forwarding information is used to forward the Interest packet to Hop 3, the Hop 2 forwarding information is removed, and the bit value in Hop Count field 518 is decremented to 01 (one). At Hop 3, Hop 3 decrements the bit value in the Hop Count field 518 to 00 (zero), triggering the insertion of a new random bit value, in this case 11 (three), into Hop Count field 518. Accordingly, Hop 3 includes three hops worth of forwarding information in F-CS 514 and F-IV 516 values for Hops 4, 5, and 6 and forwards the Interest packet based on the Hop 3 forwarding information provided by Hop 1. Hop 3 removes the Hop 3 forwarding information from the Interest packet.

The Interest packet passes through Hop 4 where the Hop 4 forwarding information is used to forward the Interest packet to Hop 5, the Hop 4 forwarding information is removed, and the bit value in Hop Count field 518 is decremented to 10 (two). The Interest packet passes through Hop 5 where the Hop 5 forwarding information is used to forward the Interest packet to Hop 6, the Hop 5 forwarding information is removed, and the bit value in Hop Count field 518 is decremented to 01 (one). At Hop 6, Hop 6 decrements the bit value in the Hop Count field 518 to 00 (zero), triggering the insertion of a new random bit value, in this case 01 (one), into Hop Count field 518. Accordingly, Hop 6 includes one hop worth of forwarding information in F-CS 514 and F-IV 516 values for Hop 7 and forwards the Interest packet based on the Hop 6 forwarding information provided by Hop 3. Hop 6 removes the Hop 6 forwarding information from the Interest packet.

Being the last hop before Producer 1102, the Interest packet passes through Hop 7 where the Hop 7 forwarding information is used to forward the Interest packet to Producer 1102 and the Hop 7 forwarding information is removed. Though a specific hop forwarding scenario is shown, the hop forwarding may occur through any combination of hops. FIG. 11B shows that random hop forwarding can occur through different hops than the hops used in FIG. 11A.

The Forwarding-IV (F-IV) value 516 is determined during a flow's first Interest—Content Object packet transmission cycle. Consumer intentions in regards to establishing a (connectionless per ICN objectives) long-live flow is indicated within the Interest packet using the Flow State field 508. PIT 208 entries for Interests with a set Flow State field 508 are marked accordingly within the PIT 208, to include a match between the interface and the Flow state field 508. Anytime an intermediate node receives a valid Content Object packet for an entry with an active flow enabled in Flow State field 508, F-IV info (the Line Card metric over which the Content Object packet is received) is piggybacked within the Content Object packet along the reverse path towards the Consumer. A number of line cards at a content router is currently limited to around 1000 (approximately 2^10), so 12-bits can be used for the line card number or, for byte-level parsing, 2-Bytes per hop to represent the locally assigned line card number associated with a given flow.

Hashing may be used to address local security concerns. Line card information may be locally hashed to a 4-Byte Hash value. Only the current hop has access to such information and can dynamically change the assigned value by piggybacking the respective change in the Content Object packets. For example, the ith hop may use a hash algorithm Hash(eLC(i+1),Prefix), which was calculated at the (i+1)th hop as the line card number in the Interest packet.

Anytime a content router initiates FIB 206 lookup process, lookup overhead (and the associated latency) at the given hop is still the same. To address the above scenario and increase lookup efficiency, the F-CS value 514 is used. As stated earlier, the F-CS value 514 represents a number of components used during the FIB 206 lookup for Interests of a given end-to-end flow. During the initial lookup stage (i.e., delivery of the first Interest packet for a given flow), a PIT 208 entry is updated with information on the number of components used during the FIB 206 lookup to determine the next hop (i.e., LPM-order). Similar to the F-IV value 516, the F-CS value 514 information is also piggybacked within the Content Object packet. Inconsistencies due to local FIB 206 changes can be handled by piggybacking the update within future Content Object packets. A limit of 256 on the number of components may be set to allow for a 1-Byte entry for the F-CS value 514.

To improve the lookup performance, a separate Hash table for the F-IV value 516 entries may be utilized. A short (e.g., 4-Byte or 8-Byte) Flow Hash may be used as determined by the Producer at the time of flow-setup. Different Flow-Hash values help differentiate between different flows. The Flow Hash may be combined with the F-CS 514 value (or short hash of a F-CS long content prefix) with use of the modulo operation to determine the matching entry in the Flow Hash Table. Combinations of two hash values help differentiate between different flows sharing the same Flow Hash value, or different flows sharing the same F-CS (hash). The main advantage for using a separate Flow Hash Table is that no significant change is needed on the FIB 206 table. A separate table may be used for updates to piggyback on received Content Object packets or update the target for the received Interest packets.

Figure 12:
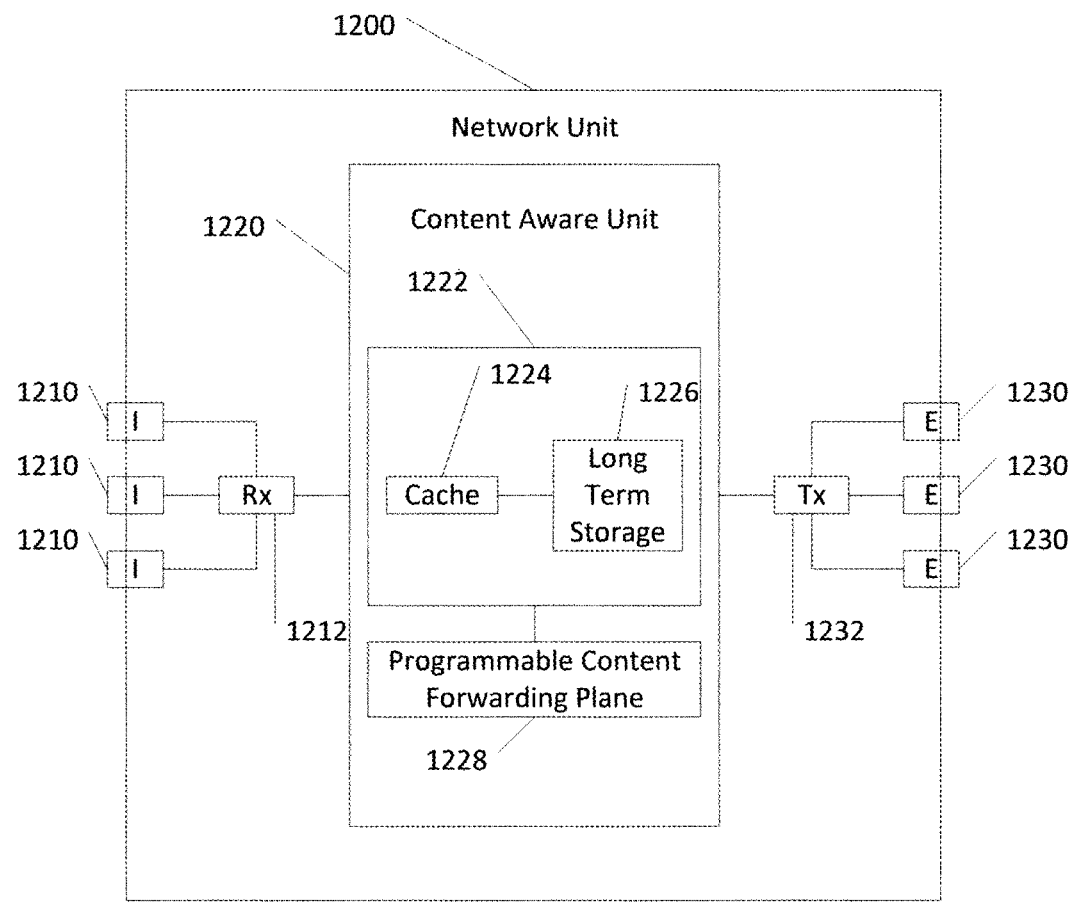
FIG. 12 illustrates a diagram of a network unit which may be any device that transports and processes data through the network.

FIG. 12 illustrates an embodiment of a network unit 1200, which may be any device that transports and processes data through network 100, including through the SDN ICN switch according to the present disclosure. For instance, the network unit 1200 may correspond to or may be located in any of the system nodes described above, such as a content router R, edge router ER, service router SR, and core router CR. The network unit 1200 may also be configured to implement or support the schemes and methods described above. The network unit 1200 may comprise one or more ingress ports or units 1210 coupled to a receiver (Rx) 1012 for receiving signals and frames/data from other network components. The network unit 1200 may comprise a content aware unit 1220 to determine which network components to send content to. The content aware unit 1220 may be implemented using hardware, software, or both. The network unit 1200 may also comprise one or more egress ports or units 1230 coupled to a transmitter (Tx) 1232 for transmitting signals and frames/data to the other network components. The receiver 1212, content aware unit 1220, and transmitter 1232 may also be configured to implement at least some of the disclosed schemes and methods above, which may be based on hardware, software, or both. The components of the network unit 1200 may be arranged as shown in FIG. 12 or arranged in any other configuration.

The content aware unit 1220 may also comprise a programmable content forwarding plane block 1228 and one or more storage blocks 1222 that may be coupled to the programmable content forwarding plane block 1228. The programmable content forwarding plane block 1228 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1220 or the network unit 1200. The programmable content forwarding plane block 1228 may interpret user requests for content and accordingly fetch content, e.g., based on meta-data and/or content name (prefix), from the network or other content routers and may store the content, e.g., temporarily, in the storage blocks 1222. The programmable content forwarding plane block 1228 may then forward the cached content to the user. The programmable content forwarding plane block 1228 may be implemented using software, hardware, or both and may operate above the IP layer or L2.

The storage blocks 1222 may comprise a cache 1224 for temporarily storing content, such as content that is requested by a subscriber. Additionally, the storage blocks 1222 may comprise a long-term storage 1226 for storing content relatively longer, such as content submitted by a publisher. For instance, the cache 1224 and the long-term storage 1226 may include Dynamic random-access memories (DRAMs), solid-state drives (SSDs), hard disks, or combinations thereof.

Figure 13:
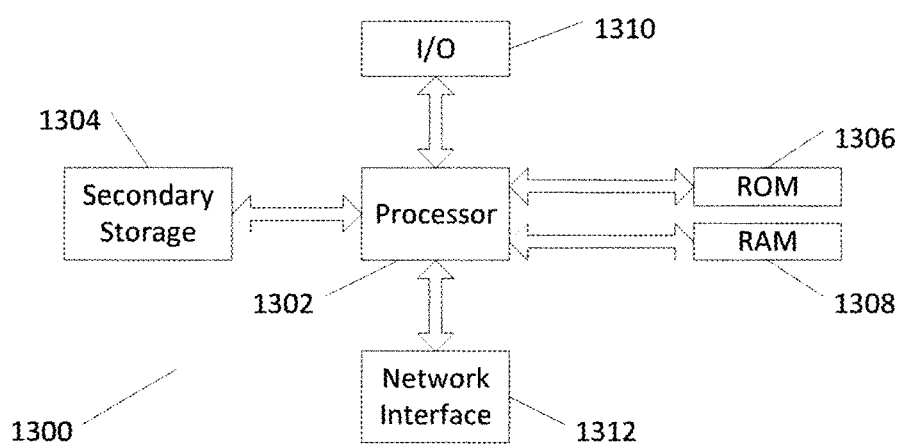
FIG. 13 illustrates a diagram of network components within a network unit.

FIG. 13 illustrates a typical, general-purpose network component 1300 suitable for implementing one or more embodiments of the components disclosed herein. The network components described above may be implemented on any general-purpose network component, such as a computer or network component with sufficient processing power, memory resources, and network throughput capability to handle the necessary workload placed upon it. The network component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The processor 1302 may be implemented as one or more CPU chips, or may be part of one or more application specific integrated circuits (ASICs).

The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

By minimizing the need for FIB 206 lookup or avoiding it whenever possible, as disclosed herein, the overall processing overhead for an Interest-Content Object packet pair can be reduced by more than 44%. Such reduction allows a CCN router to almost double a number of packets it can process per second. Furthermore, with additional hardware support (i.e., on-chip Bloom filters to search for existing PIT/FIB entries), use of faster memory components to store the PIT entries, and overhead limited to memory access (which suggests that the majority of the overhead is due to FIB 206 lookups), a 4-to-12 times performance (i.e., forwarding capacity) improvement can be achieved. By also storing FST 600 entries on faster memory components due to smaller space requirements (e.g., same number of entries requires 70% less space with FST 600 when compared to FIB 206), access time to flow entries is significantly reduced (i.e., more than 5 times when compared to FIB 206 access latency). Significant energy savings are also possible with the disclosed architecture, with improvements proportional to active flow count, ratio of flow-based traffic, and line rate, to support green networking.

In summary, the disclosed overlay forwarding architecture utilizes a flow-driven adaptive forwarding strategy with tradeoffs between flexibility and scalability. The disclosed architecture exploits the correlations in user traffic to create active flow states in content routers to bypass the default CCN forwarding for future requests. The proposed flow-driven forwarding solution limits the number of lookups performed on an end-to-end basis by enabling the bypassing of lookups at certain hops along the path to the content Producer. For that purpose, previously made local forwarding decisions are used to speed up the processing of Interest packets.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for providing flow-driven forwarding in an information-centric network, comprising:
   a content store configured to store content objects;
   a pending interest table memory configured to maintain a list of Interest packets requiring resolution;

a plurality of network interfaces configured to receive and transmit Interest packets and Content Object packets;

a forwarding information base memory configured to maintain a list of network interfaces through which an Interest packet is to be sent;

a flow state table memory configured to maintain flow forwarding information for one or more flows associated with Interest packets;

forwarding logic memory including computer readable instructions; and a processor coupled to the forwarding logic memory and, upon executing the computer readable instructions, configured to:

receive an Interest packet;

determine there is no content associated with the Interest packet being locally stored in the content store;

determine there is no previously received Interest packet requesting the content in the pending interest table memory;

identify a flow state indication in the Interest packet;

extract the flow forwarding information from the Interest packet or the flow state table memory in response to the flow state indication indicating an active flow; and forward the Interest packet to an appropriate a network interface in accordance with the flow forwarding information.

2. The apparatus of claim 1, wherein the processor is configured to remove the flow forwarding information associated with the appropriate network interface prior to forwarding the Interest packet.

3. The apparatus of claim 1, wherein the processor is configured to: identify a hop count in the Interest packet; and extract the flow forwarding information from the flow state table memory in response to the hop count being zero.

4. The apparatus of claim 3, wherein the processor is configured to: determine that the extracted flow forwarding information involves two or more hops;

and update the hop count in the Interest packet to a value equal to a number of hops involved in the extracted flow forwarding information.

5. The apparatus of claim 4, wherein the processor is configured to modify the Interest packet to include the extracted flow forwarding information.

6. The apparatus of claim 1, wherein the processor is configured to: identify a hop count in the Interest packet;

extract the flow forwarding information from the Interest packet in response to the hop count being greater than zero;

decrement the hop count; and include the decremented hop count in the Interest packet.

7. The apparatus of claim 1, wherein the processor is configured to: perform a full lookup in the forward information base memory in response to the flow state indication indicating that the Interest packet is not associated with a flow or in response to the flow state indication indicating that a flow is being setup.

8. A method for providing flow-driven forwarding in an information-centric network, comprising:

receiving an Interest packet;

determining there is no content associated with the Interest packet being locally stored;

determining there is no previously received Interest packet requesting the content; identifying a flow state indication in the Interest packet;

extracting flow forwarding information from the Interest packet or a flow state table in response to the flow state information indicating an active flow; and forwarding the Interest packet in accordance with the flow forwarding information.

9. The method of claim 8, further comprising:

removing the extracted flow forwarding information from the Interest packet prior to forwarding.

10. The method of claim 8, further comprising: identifying a hop count in the Interest packet; and extracting the flow forwarding information from the flow state table in response to the hop count being zero.

11. The method of claim 10, further comprising:

determining that the extracted forwarding information involves two or more hops; and updating the hop count in the Interest packet to a value equal to a number of hops involved in the extracted flow forwarding information.

12. The method of claim 11, further comprising:

modifying the Interest packet to include the extracted flow forwarding information.

13. The method of claim 8, further comprising:

identifying a hop count in the Interest packet; and extracting the flow forwarding information from the Interest packet in response to the hop count being greater than zero;

decrementing the hop count; and including the decremented hop count in the Interest packet.

14. The method of claim 8, further comprising:

performing a full lookup in a forward information base in response to the flow state indication indicating that the Interest packet is not associated with a flow or the flow state indication indicating that a flow is being setup.

* * * * *